March 2, 1926.

W. BILLINS 1,574,864

COMBINED TRACTOR AND POWER PLANT

Filed August 30, 1924   3 Sheets-Sheet 1

Fig. 3.
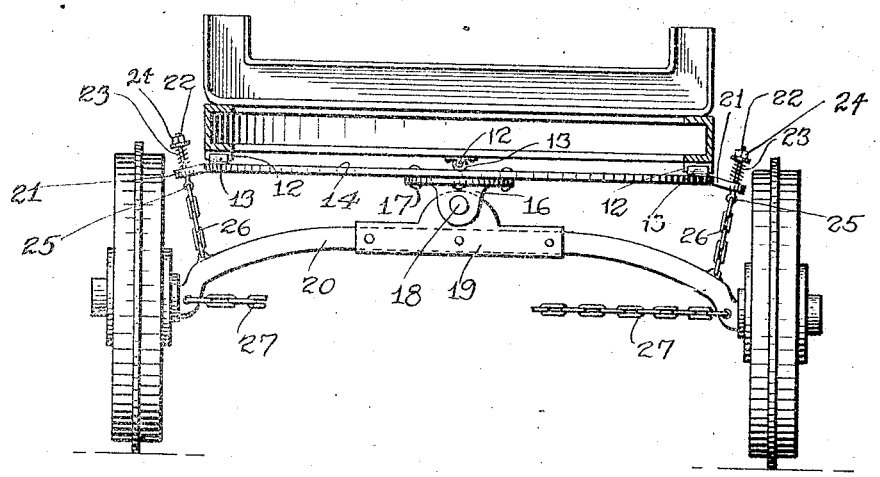
Fig. 4.
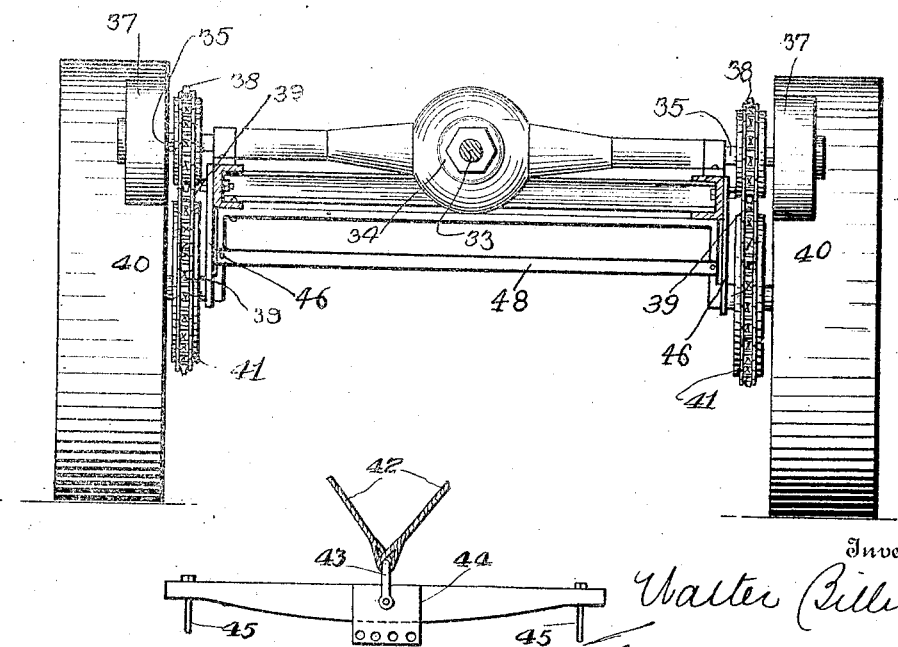
Fig. 5.

Patented Mar. 2, 1926.

1,574,864

UNITED STATES PATENT OFFICE.

WALTER BILLINS, OF VIOLA, ARKANSAS.

COMBINED TRACTOR AND POWER PLANT.

Application filed August 30, 1924. Serial No. 735,116.

*To all whom it may concern:*

Be it known that I, WALTER BILLINS, a citizen of the United States of America, and resident of Viola, in the county of Fulton and State of Arkansas, have invented certain new and useful Improvements in Combined Tractors and Power Plants, of which the following is a specification.

This invention relates to combined trucks, tractors and power plants for farmers' use, and has for an object the production of an automobile chassis, associated with means for operating or driving machines such as saws, feed cutters, corn shellers and other machines used by farmers; thus making it possible to utilize the machine as a tractor for pulling farm implements such as harrows, plows or the like, or the device may be provided with a body or bed in which material may be hauled, or when in a stationary position the tractor driving means may be disconnected in order that the power of the motor may be utilized for operating saws, feed cutters, corn shellers or the like.

It is a further object of this invention to produce a machine in which plows or cultivators may be drawn, means being provided whereby the tractor can turn practically at right angles from one row into the next, and the device is intended for operating harrows of large type or gang plows; and it can be furthermore employed for pulling headers, binders or mowers in the same way as other tractors are employed for this purpose, or it can be used for drawing planters of corn and cotton with double or single row attachments, as one skilled in the art will understand.

It is a further object of this invention to produce a device of utility in that the front wheels may be permitted comparatively great latitude of vertical movement independently of each other, without liability of tilting the machine or interfering with its bearings.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 3 illustrates a sectional view on the line 3—3 of Fig. 1 omitting the motor;

Figure 4 illustrates a sectional view on the line 4—4 of Fig. 1; and

Figure 5 illustrates a detail view of the coupling by which farm implements are connected to the tractor.

Figure 1:
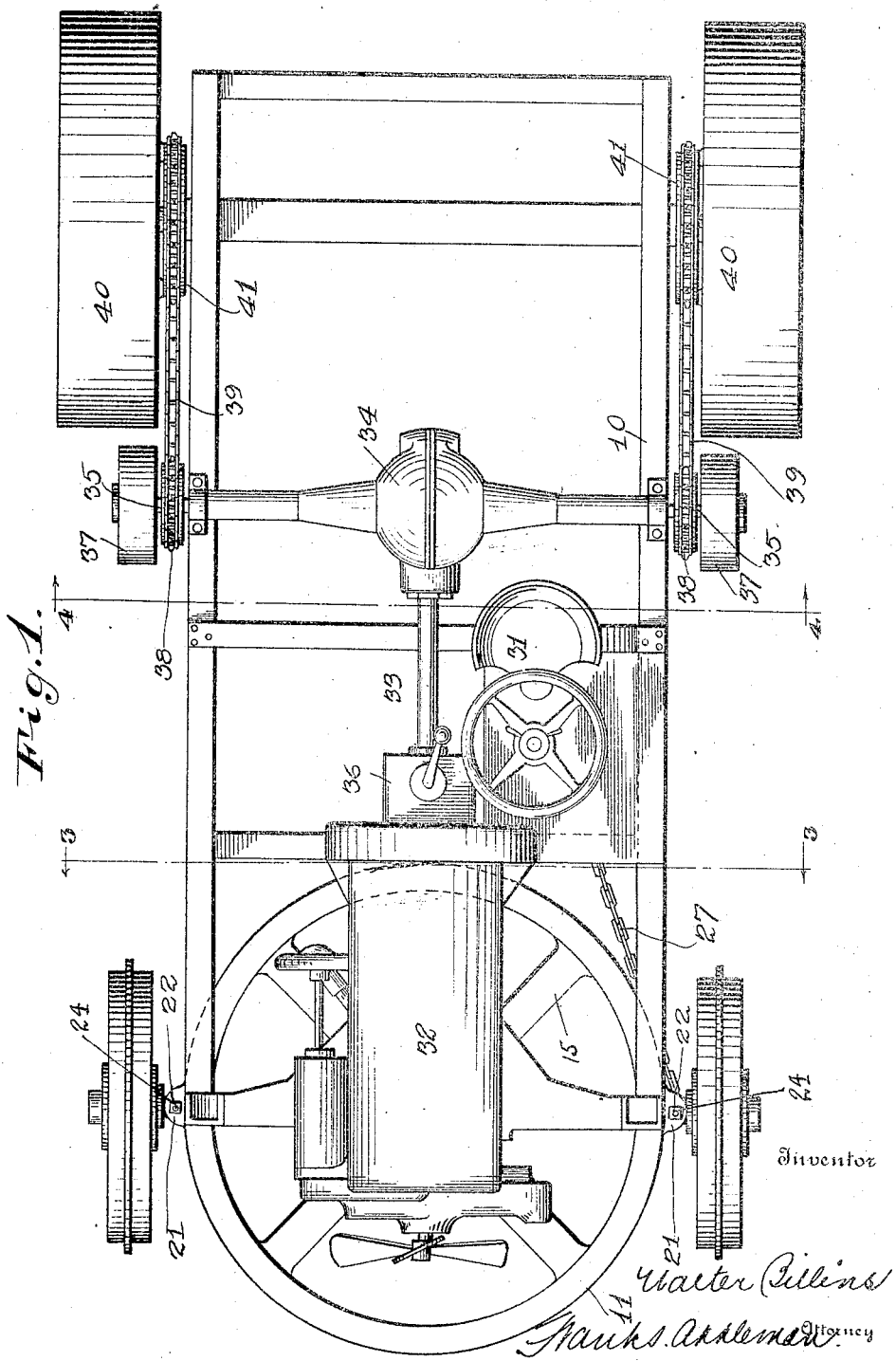
Figure 1 illustrates a plan view of a combined tractor and power plant embodying the invention.
Figure 2:
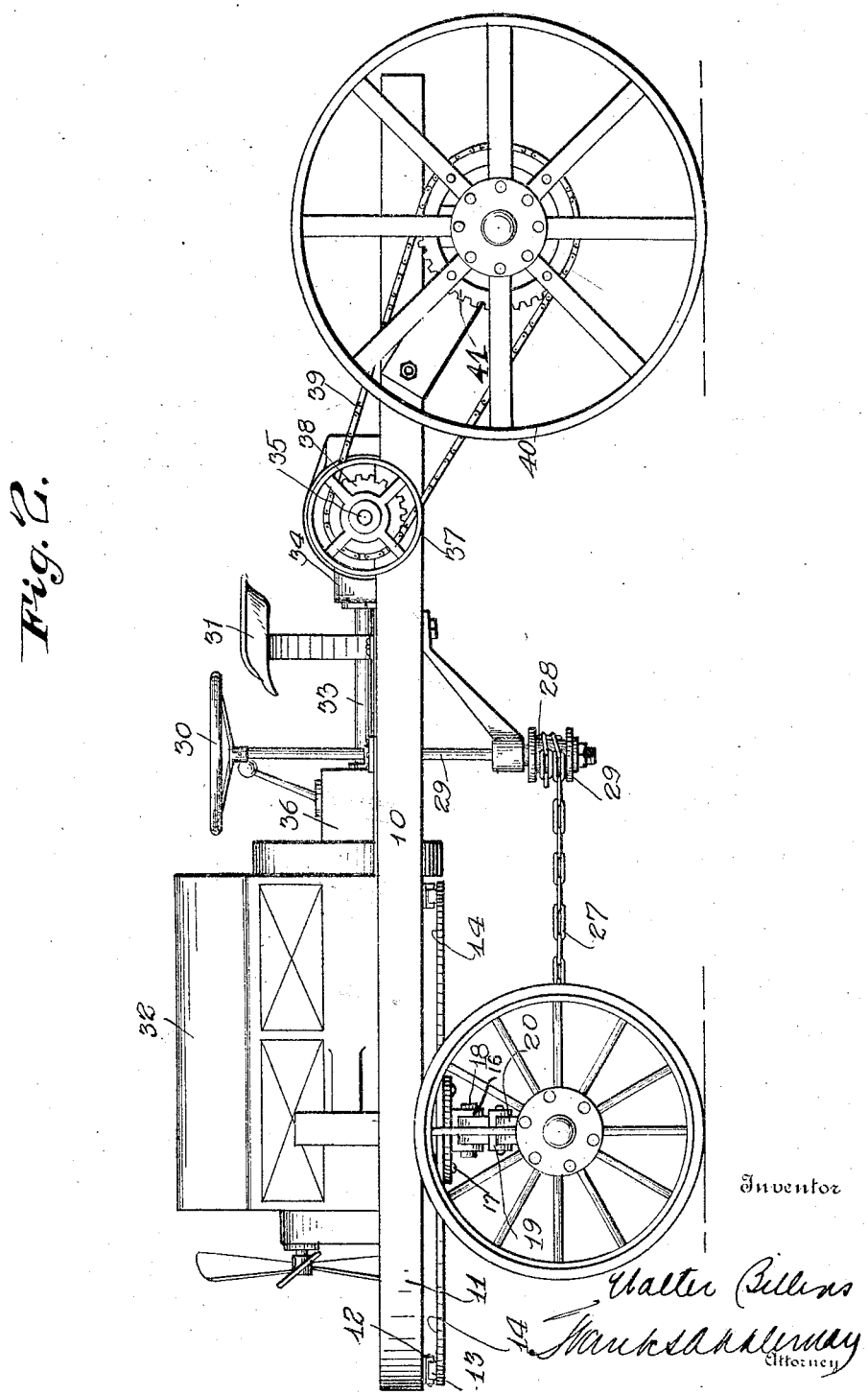
Figure 2 illustrates a side elevation thereof.

In these drawings, 10 denotes a frame, the sides of which are joined together in front by a curved extension 11. Brackets 12 are arranged on the under surface of the frame in which anti-friction elements 13 such as rollers are rotatably mounted to engage a circular rail or platform 14 which constitutes a support for the frame below the motor.

In the present embodiment of the invention, the circular track 14 has arms 15 forming a spider, and these arms converge at the center of the track and constitute supports for a bracket 16 that is secured to the spider by fastenings 17 such as rivets or the like. The bracket 16 is mounted on a horizontal pivot 18 extending longitudinally of the chassis, the said pivot being carried by a bracket 19 secured on the front axle 20 of the chassis. By the arrangement just described, it will be seen that the track 14 is mounted for oscillation transversely of the truck and the said track is held yieldably in a horizontal position.

As shown in the drawing, each side of the track is provided with an apertured ear 21 through which a bolt 22 extends, the said bolt having a spring 23 encircling it between the ear and an adjustable nut 24 that may be threaded on the bolt, and by this arrangement, the tension of the spring may be changed so that it will yield to greater or less extent, according to its tension. The bolt has an eye 25 below the ear and a flexible element 26 such as a chain is connected to the eye of the bolt and to the axle 20. This mounting acts as a brace to prevent undue oscillation of the track, but permits it to yield when undue strain is applied to either side of the track by the tilting of the truck, or for other reasons. The springs, however, are of such strength as to cause the parts to retain normal positions under ordinary conditions of use.

A steering chain 27 is connected to the axle near each end and the said chain operates around a drum 28 rotatable with the steering shaft 29, the said steering shaft extending upwardly and preferably provided with a hand wheel 30 at its upper end that is within convenient reach of an operator that may be stationed on the seat 31.

The power unit or motor may be of any conventional type located under the hood 32, but as the power plant is an immaterial matter as to detail, the same is not illustrated except conventionally. It is believed sufficient to say that any suitable drive shaft 33 may lead from the motor to a differential gear of known construction located in the casing 34, and that the shaft or axle 35 will be driven through the use of the power shaft and differential, as well as through the use of the transmission gear that may be located in the casing 36.

The shaft 35 is also provided with a pulley 37 at each end, which may be utilized for driving belts connected to circular or other saws, corn shellers, feed grinders or the like; it being understood that when the power is utilized for the purpose indicated, the tractor, to be presently explained, will be disconnected.

The shaft 35 is also provided with sprocket wheels 38 that are engaged by sprocket chains 39 for driving the traction wheels 40, the said traction wheels being rotatable with the sprockets 41 that are engaged by the sprocket chains 39. When the power plant is to be employed for driving saws, grinders and the like, the chains 39 will be disconnected from the traction wheels and the tractor will then be stationary while the power plant is being employed for domestic purposes. When the sprocket chains 39 have been removed, the sprocket wheels 38 could be used in connection with long sprocket chains that might be used for operating machinery instead of belts. Sprocket chains would be employed only where unusual power is to be transmitted, as under ordinary conditions, belts operating over the pulleys will be found more satisfactory. In the employment of the power plant, the belts to the pulleys or the chains to the sprocket wheels would extend forwardly and two or more machines could be driven at one time, since provision is made for using two belts or flexible connections between the shaft 35 and the machinery to be operated.

The coupling by which farm implements may be connected to the tractor comprises a cable or chain 42 that may be connected to the chassis frame and operates through a link 43 of the draft bar 44. The draft bar may have clevises, links or other couplings 45 at its ends by which the couplings from the farm implements may be connected to the draft bar.

A brace 46 at each side of the frame has one end anchored to the frame and the other end is applied to the axle or shaft 47 of the traction wheel to strengthen the structure and hold the axle or shaft in proper relation to the shaft 35. There is also a brace 48 extending laterally of the frame for bracing the axles or shafts 47, as fully shown in Fig. 4.

I claim:

In a combined tractor and power plant, a frame, a front axle for the said tractor, a circular platform for supporting the front of the frame, means for oscillatably mounting the platform on the front axle, apertured ears projecting laterally of the frame from the said platform, a bolt extending through each ear, a spring encircling each bolt above the ear, means on each bolt for forcing a spring into contact with the ear, and flexible elements connecting the bolts to the axle whereby the platform is held in normal position.

WALTER BILLINS.